United States Patent [19]

Rassieur

[11] Patent Number: 5,219,056
[45] Date of Patent: Jun. 15, 1993

[54] CLUTCH LOCK-OUT ASSEMBLY

[76] Inventor: Charles L. Rassieur, 30 Muirfield La., Creve Coeur, Mo. 63141

[21] Appl. No.: 912,258

[22] Filed: Jul. 13, 1992

[51] Int. Cl.$^5$ .................... F16D 23/12; G05G 5/06
[52] U.S. Cl. .................... 192/99 S; 74/527; 192/114 R
[58] Field of Search ............ 192/99 S, 114 R, 83; 74/527

[56] References Cited

U.S. PATENT DOCUMENTS

| | | | |
|---|---|---|---|
| 1,562,823 | 11/1925 | Dodge | 192/99 S |
| 1,563,035 | 11/1925 | Losee | 192/99 S X |
| 1,572,370 | 2/1926 | Smith | 192/99 S X |
| 2,027,659 | 1/1936 | Weisbrod | 192/99 S X |
| 3,199,367 | 8/1965 | Zetye | 192/99 S X |
| 3,498,433 | 3/1970 | Lohmann | 192/99 S |
| 3,527,309 | 9/1970 | Rassieur | 173/28 |
| 4,248,331 | 2/1981 | Behrens | 192/114 R X |
| 4,637,503 | 1/1987 | Vohl | 192/99 S X |
| 4,723,933 | 2/1988 | Marto | 192/99 S X |
| 5,038,907 | 8/1991 | Baumann | 192/99 S |
| 5,062,316 | 11/1991 | Lykken et al. | 74/527 X |
| 5,085,280 | 2/1992 | Rassieur | 173/176 |

*Primary Examiner*—Rodney H. Bonck
*Attorney, Agent, or Firm*—Polster, Lieder, Woodruff & Lucchesi

[57] ABSTRACT

In a machine such as a vehicle mounted earth drill, in which a rotating element is driven by an internal combustion engine, a clutch operating lever arm or handle is hingedly mounted on a plate, the plate is mounted on a fixed frame, the lever arm is spring biased in a direction away from the plate, and a keeper is provided having a receiving channel with a lip past which the arm moves in response to the bias of the spring when the arm is rotated with the plate about the pivot of the plate to a point beyond the lip, whereby when the arm is released at a point beyond the lip it is engaged in the channel until the arm is moved manually against the bias of the spring to a place clear of the lip.

13 Claims, 2 Drawing Sheets

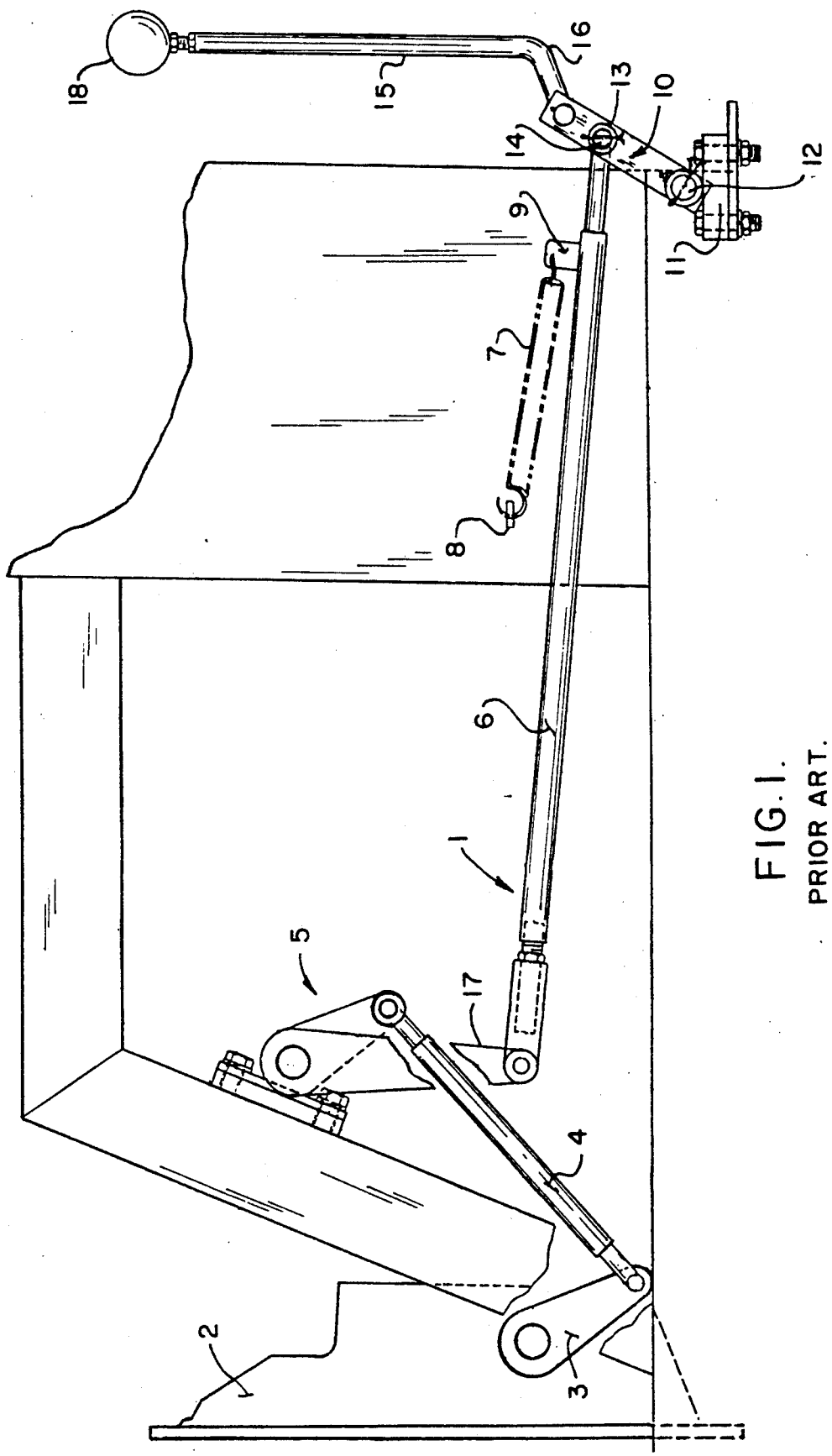
FIG. I.
PRIOR ART.

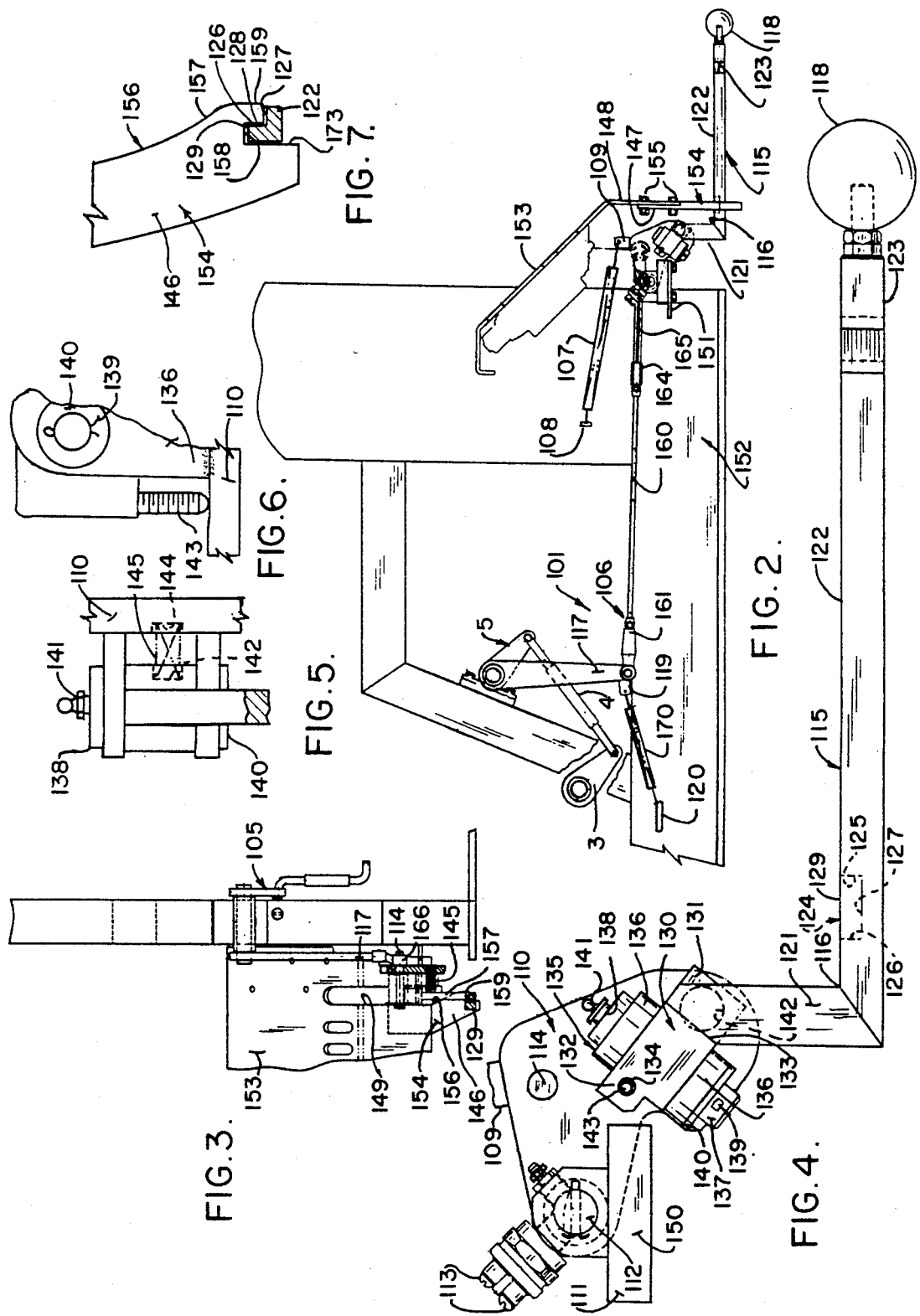

CLUTCH LOCK-OUT ASSEMBLY

BACKGROUND OF THE INVENTION

This invention has to do with the operation of a clutch between an internal combustion engine and a rotating element. It is described as applied to a vehicle-mounted earth drill, of the type shown generally in Rassieur U.S. Pat. No. 3,527,309, but its usefulness is not limited to such a device. It does have particular utility as applied to the system illustrated in Rassieur U.S. Pat. No. 5,085,280, as will be described.

In a conventional clutch arrangement to which the illustrative embodiments of the prior art of FIG. 1 and of the mechanism of the present invention are described as applied, a pressure plate assembly is mounted on a flywheel of an internal combustion engine and a clutch plate is mounted on an output shaft. The pressure plate assembly includes an axially movable pressure plate and powerful compression springs which bias the pressure plate into engagement with the clutch plate. Radially inwardly extending fingers are pivoted in the pressure plate assembly to retract the pressure plate against the bias of the pressure plate springs when the fingers are moved in a direction toward the clutch plate, to disengage the pressure plate from the clutch plate. The fingers are moved against the bias of the pressure plate springs by a throw-out bearing, slidably mounted on the output shaft. The throw-out bearing is moved by a yoke fixedly mounted on a shaft journalled in bearings in the clutch housing. One end of the shaft projects from the housing, and a clutch throw-out (lever) is mounted on the outer end of the shaft. When the throw-out is moved, it rotates the shaft, rotating the yoke and moving the throw-out bearing against or away from the pressure plate assembly fingers. It is desirable to keep the throw-out bearing clear of the fingers, which are rotating with the pressure plate, hence relative to the throw-out bearing, when the clutch is engaged. When the clutch is in a power train from the engine to a rotating member such as an earth drill, it is conventional to provide manual means for operating the throw-out, to engage and disengage the clutch. In the system described in U.S. Pat. No. 5,085,280, the manual system is overridden by a mechanical throw-out mechanism in case of emergency, but in ordinary operation, the throw-out is operated by moving a long handle up to engage the clutch, and down to disengage it.

A typical prior art clutch operating and lock-out assembly is illustrated in FIG. 1. The clutch lock-out assembly 1 includes a clutch throw-out 3, which in FIG. 1 is shown as connected to the shaft journalled in and projecting from a clutch housing 2; a connecting rod 4; an intermediate linkage 5 that includes an intermediate linkage lever 17; an operating rod 6, a retracting spring 7 mounted at one end on a spring bracket 8 connected to a fixed frame of the machine and connected at its other end to a spring ear 9 connected to the operating rod 6; a lever 10 from which a stub shaft or axle 12 projects; a pillow block 11 in which the axle 12 is journaled; a gudgeon 14 operatively connected to the operating rod 6 and to the lever 10, and a handle 15 secured at one end to the lever 10. The handle 15 has a short dog leg 16 at an end at which it is secured to the lever, a long straight reach, and, at its outer end, a knob 18.

The gudgeon 14 is positioned between the axle 12 and the end of the lever to which the handle is connected. When the handle is pulled down, rocking the lever lo around the axle 12 against the bias of the pressure plate springs and the much weaker bias of the spring 7, pulling the lever 17 in a direction toward the handle 18, the gudgeon 14 moves to a point below the axle 12 sufficiently far so that the bias of the pressure plate springs and the spring 7 keeps the lever and handle from moving back up. There are several disadvantages inherent in the system described. As a practical matter, the amount of throw is limited, because when the gudgeon 14 moves below the axle 12, in order to ensure that the handle remains down, the gudgeon has to move back toward the lever 17, thus moving the lever 17 back toward the clutch engaging condition. This means that the lever 17 must be made relatively short so as to ensure sufficient travel of the throw-out 3. The handle is not locked against upward movement. Also, with the automatic mechanical disengagement of the clutch in response to the actuation of a switch, as described in U.S. Pat. No. 5,085,280, the rigid rod 6 is moved against the bias of the spring 7, causing the handle 15 to move downwardly rapidly, which could disconcert an operator.

One of the objects of this invention is to provide a clutch operating mechanism in which a handle is positively restrained against movement from a throw-out position.

Another object is to provide such a mechanism which permits a longer throw in the same or less amount of space than is possible with a conventional clutch operating mechanism.

Another object is to provide such a system in which the automatic disengagement of the clutch will not affect the handle.

Other objects of this invention will be apparent to those skilled in the art in light of the following description and accompanying drawings.

SUMMARY OF THE INVENTION

In accordance with this invention, generally stated, in a machine in which a rotating element is driven by an internal combustion engine, wherein a drive train between the rotating element and the engine includes a clutch the engagement of which transmits power to rotate the element and the disengagement of which disconnects the element from the engine, a clutch operating mechanism is provided that includes a manually operated elongated lever arm or handle by which the clutch is moved manually to disengaged condition, the arm being hingedly mounted on a plate. The plate in turn is pivotally mounted on a fixed frame and operatively connected to move the clutch between engaged and disengaged conditions. The plate is continually biased in one direction of rotation around the pivot, and the lever arm is preferably spring biased in a direction away from the plate. A keeper has a receiving channel into which the arm is moved when the arm is in its clutch lock-out position. The keeper has a lip past which the arm moves when the arm is rotated with the plate, against the bias of the springs biasing the plate toward clutch-engaging position around the pivot of the plate, to a point beyond the lip, whereby, when the arm is released at that point it is engaged in the channel until it is moved manually first out of the channel against the bias of the plate around its pivot, and then, in the preferred embodiment, transversely, against the bias of the arm spring, to a place clear of the lip.

In the preferred embodiment, the plate is connected to an intermediate linkage lever through a flexible cable that pulls the intermediate lever in response to the movement of the arm from a position at which the arm is substantially vertical to one at which it is substantially horizontal. When the arm is returned to its vertical position, springs restore the intermediate lever to its initial position, in which the clutch is engaged. At the same time, another spring, acting on the plate, maintains the arm in its vertical position even if the clutch is thrown out manually, in which case the intermediate lever would move in the direction toward the handle, causing the flexible cable to buckle.

BRIEF DESCRIPTION OF THE DRAWINGS

In the drawings, FIG. 1 is a somewhat fragmentary view in side elevation of a prior art clutch operating mechanism;

FIG. 2 is a fragmentary view, corresponding to the view shown in FIG. 1, of one embodiment of clutch operating mechanism of this invention;

FIG. 3 is a fragmentary view in front elevation, partly broken away and partly in section, of the mechanism shown 8n FIG. 2;

FIG. 4 is an enlarged detailed view of the handle and plate subassemblies;

FIG. 5 is an enlarged fragmentary detailed view in front elevation a from right to left in FIG. 4;

FIG. 6 is a fragmentary bottom plan view as the mechanism is shown FIG. 4; and

FIG. 7 is a fragmentary view of a keeper with a handle retained in a channel thereof.

DESCRIPTION OF THE PREFERRED EMBODIMENT

Referring now to the drawing, and particularly to FIGS. 2-7, for one illustrative embodiment of this invention, reference numeral 101 indicates the complete mechanism, which includes a clutch throw-out 3, a connecting rod 4, and an intermediate linkage 5 which is the same as the conventional device shown in FIG. 1, except that an intermediate linkage lever 117 is longer than the corresponding lever 17 of the prior art device.

In this embodiment, a spring mounting ear 119 is welded to a lower rear edge of the lever 117 and a lever moving tension spring 170 has one end mounted on the ear 119 and another end mounted on a spring bracket 120 mounted on a fixed frame member. The spring 170 serves to keep the throw-out bearing away from the fingers on the pressure plate assembly when the clutch is engaged, as was described in the background of the invention, and to keep tension on a flexible cable 160 that is described hereinafter.

At the lower end of the lever 117, a clevis 161 is mounted on a clevis pin through a hole in the lever 117. The clevis 161 is part of a clutch cable assembly 106, which includes the flexible cable 160, a cable fitting 164 at the end opposite the clevis 161, a threaded cable receiver rod 165, and a rod end 166 which includes a conventional ball joint mounted on a pin 114 extending through a hole in a plate 110. The cable 160 is mounted securely in a fitting in the stem of the clevis 161 and in the fitting 164 which is screwed onto the end of the rod 165.

In the embodiment shown, the plate 110 is roughly heart-shaped, with two lobes and an apex, as shown in FIG. 4. The pin or gudgeon 114 is located near the apex. Near an end of the lobe nearest the lever 117, the plate is provided with a stud shaft 112 welded to and projecting perpendicularly from a flat surface of the plate. The shaft 112 is journalled in a pillow block 111 and in this embodiment, is provided with a flat on its periphery, which cooperates with a plunger that operates a switch to which terminals 113 are connected. This is part of a lock-out system to ensure that the internal combustion engine that drives the clutch will not start initially with the clutch in engaged condition.

A heavy base 150 of the pillow block 111 is bolted to a bracket 151 that is welded or otherwise secured to a heavy frame 152 of the machine or the vehicle on which the machine is mounted.

A hinge or ginglymus 135 is mounted on the other lobe of the plate 110. The hinge 135 is made up of spaced standards 136 which carry between them a pintle 137. The pintle has a head 138 at one end and a cotter pin 139 extending through a diametric hole in the end of the pintle opposite the head 138. The head end of the pintle also carries a grease fitting 141. The pintle 137 carries a knuckle block 130. The knuckle block 130 has a handle leaf 131 that projects beyond an edge of the standards 136, as shown particularly in FIG. 4, and an adjustment leaf 132 that extends beyond an opposite edge of the standards 136. On a side of the hinge leaf 131 facing the plate 110, the leaf is provided with a spring receiving seat or well 142. A counterpart seat or well 144 is provided in the plate 110, as shown in FIG. 5, and the two wells receive between them a handle-biasing compression spring 145. The surface of the leaf 131 opposite the side in which the well 142 is provided, is stepped, to provide a step or shoulder 133. The adjustment leaf 132 has a threaded hole 134 through it, into which an adjusting screw 143, in the form of a threaded rod with a hex socket in its upper end, is threaded to permit adjustment of the amount of rotation throw of the knuckle block around the pintle.

A handle 115 is secured to the handle leaf 131. The handle 115 includes a short forearm 121, a long outer arm 122, which meets the short arm in a right angle elbow 116, and a knob 118. In the embodiment shown, there is a jog or offset 123 in the arm 122, adjacent the knob 118. An end of the short forearm 121 is chamfered and welded to the handle leaf 131, or otherwise secured to it, with the face of the chamfer against the step 133. The angle of the chamfer is such as to position the long arm 122 of the handle substantially horizontally when the handle is in its lowermost position, as will be explained.

A notch 124, opening through an upper edge of the arm 122 is provided in the arm 122 a short distance from the elbow 116 as compared With the full length of the arm 122. The notch is defined by an end wall 125, an end wall 126, a bottom wall 127 and a back 128. The notch, and an unnotched side wall of the arm 122 define a bar 129.

A cowling 153 is mounted on the machine or a frame of the vehicle. The cowling has a handle-accommodating slot 149 in it, opening through a lower edge of a vertical skirt portion 148 of the cowling 153.

A keeper 154 is bolted to the skirt 148 by means of bolts 155 as shown in FIG. 2. The keeper has an upper section 147 with an edge parallel with and coincident with one edge of the slot 149, and a lower section 146, extending beloW the open mouth of the slot 149. The lower seCtion has a sloped edge 156, starting at a corner of the slot wall 149 along which the upper section 147 of the keeper extends, in a direction across the slot, to provide an arm engaging area 157. The area 157 of the edge 156 ends at an outside corner of a lip 159. An inboard edge of the lip 159 defines, with a top wall, and a vertical arm-stop wall 173, a channel 158 of a width to receive the bar 129 of the handle, and a depth to accommodate the height of the bar 129, with the bottom wall 127 of the notch 124 extending under the lip 159.

As can be seen from FIG. 2, the length of the keeper and the angle of chamfer of the forearm of the handle are such as to position the long outer arm of the handle substantially horizontal when the handle is received in the channel 158.

The operation of the mechanism is largely self-explanatory. The action of the springs 107 and 170 normally biases the handle 115 into a position at which the long arm 122 stands substantially vertically. To throw out the clutch, the handle is pulled down, against the bias of the springs 107 and 170 and the much greater bias of the pressure plate springs, to pull the cable 160, hence the lever 117 to the position shown in FIG. 2, in which the throw-out bearing has rocked the pressure plate fingers against the bias of the pressure plate springs, to disengage the pressure plate from the clutch plate. As the handle is pulled down against the bias of the various springs, the handle-biasing spring 145 biases the arm against the edge 157 of the keeper 154, which cams the arm toward the plate 110 against the bias of the spring 145 until the handle has cleared the lip 159, when the bias of the spring moves the bar 129 under the lip and against the wall 173. When the handle is released, the bar 129 moves into the channel 158, with the bottom wall or shelf 127 projecting under the lip 159. The lip 159 is short, on the order, for example, of eight millimeters, so that the return of the handle from its most fully depressed point is negligible as compared with the reverse throw of the rod 6 of the conventional over-center mechanism. In spite of the shortness of the lip 159, the lever is securely and positively held in its lowermost, clutch disengaging position, because the bias of the spring 145 keeps it against the wall 173, and the bias of the other springs keeps it against the upper edge of the channel.158. In order for an operator to engage the clutch, he must push the handle down, and pull it, against the bias of the spring 145, to a position clear of the lip 159. The handle 115 is held in its position in which the arm 122 is upright, by the spring 107. Accordingly, if the mechanical throw-out is actuated, as described in U.S. Pat. No. 5,085,280, the movement of the lever 117 in a direction toward the handle 115 causes the flexible cable 16o to buckle, but does not drive the handle downwardly. Because substantially the entire travel of the gudgeon 114, hence the cable 1? 6, is utilized, the lever 117 can be made longer than the corresponding lever in a conventional arrangement, which makes the force necessary to move the throw-out 3 less.

Numerous variations in the construction of the mechanism of this invention will occur to those skilled in the art in the light of the foregoing disclosure. Merely by way of example, the elbow in the handle can be modified or eliminated. It is shown in the preferred embodiment because it lends itself to retrofitting of existing machines. The camming surface of the keeper can be modified or even eliminated, although the camming surface is much to be desired, in that it permits an operator to pull the handle straight down and simply to permit the handle to move under the bias of the spring 145 into the channel 158 at the end of the stroke, the camming and subsequent movement into the channel requiring little conscious effort on the part of the operator. Different means for biasing the various elements can be provided, or the means biasing the handle transversely from the plate can be omitted, although the biasing of the handle toward the lip of the keeper is much to be desired, as has been indicated above. The notch in the handle can be eliminated, although that makes it necessary to increase the width of the keeper channel and the distance the arm must be moved manually to disengage the arm from the channel. The shape and size of the plate can be varied. The keeper can be mounted on another fixed member different from the cowling. These are merely illustrative.

Having thus describd the invention, what is claimed and desired to be secured by Letters Patent is:

1. In a machine in which a rotating element is driven by an internal combustion engine, wherein a drive train between said element and said engine includes a clutch the engagement of which clutch transmits pwoer to rotate said element and the disengagement of which clutch disconnects said element from said engine, and wherein a clutch operating mechanism includes a manually operated handle by which said clutch is manually engged and disengaged, the improvement in said clutch operating mechanism comprising said handle being hingedly mounted on a plate, said palte being pivotally mounted on said machine and operatively connected to engage and disengage said clutch, said plate being continually biased in one direction of rotation around said pivot, and a keeper having a receiving channel with a lip past which said handle is moved when said handle is rotated with said plate against the bias of said plate about said pivot to a point beyond said lip, wehreby, when said handle is moved transversely past said lip and released at that point, said handle is engaged in said chanenl until said handle is moved manually to a place clear of said lip.

2. The improvement of claim 1 wherein said handle is spring biased in a direction away from said plate, said handle moves in response to said bias past said lip, and said handle is engaged in said channel until said handle is moved manually against the bias of said spring to a place clear of said lip.

3. The improvement of claim 1 wherein said handle includes an elbow with a short forearm, one end of which is secured to a leaf of a spring-loaded ginglymus mounted on said plate and a relatively long outer arm with a free end, said keeper being positioned along said outer arm close to said elbow relative to said free end.

4. The improvement of claim 3 wherein said handle is substantially rectangular in section, with parallel side walls, and said handle outer arm has a notch including two end walls and a back wall, said back wall being spaced from one of said side walls to define a bar of a width to fit within said channel and a shelf that projects under said lip when said arm is positioned to be held by said keeper.

5. The improvement of claim 1 wherein the keeper channel opens downwardly, and the rotational bias of the plate is in a direction to move said outer arm to an upright position.

6. The improvement of claim 5 wherein the keeper is a heavy plate with a channel one side of which is defined by said lip, said keeper plate having an edge, terminating at a free end of said lip facing said outer arm.

7. The improvement of claim 6 wherein said keeper plate is replaceably mounted on said machine.

8. The improvement of claim 1 wherein said pivotally mounted plate is generally heart shaped with two lobes and an apex, said plate being pivotally mounted in a bearing in which a shaft projecting from one of said lobes is journaled, a spring biased ginglymus with a projecting leaf is mounted on the other of the lobes, said leaf being biased by said spring in a direction away from said plate, said handle being secured to said leaf, and a cable fitting is pivotally mounted on said apex.

9. The improvement oc alim 8 wherein the ginglymus has two leaves, one on either side of a pintle, to one of which leaves said handle is secured, and in the other of which leaves an adjustable stop is mounted, one end of which stop bears on said plate to limit the distance that the ginglymus leaf, hence said hnadle, is biased away from said plate.

10. The improvement of claim 6 wherein said edge of said keeper plate facing said outer arm is sloped in a direction toward said plate downwardly toward said lip, a portion of said edge being positioned to engage said outer arm in the outwardly biased condition of said outer arm as said outer arm is moved toward said lip, whereby said outer arm is moved and held by said edge against the bias of said spring until the outer arm clears the lip.

11. The improvement of claim 1 wherein said plate is connected to an intermediate linkage to said clutch by a flexible cable.

12. The improvement of claim 11 wherein the cable is normally held in tension by a spring.

13. The improvement of claim 11 wherein said plate has spring anchoring means on it and said machine has a spring bracket secured to it, a spring is provided, anchored to and extending between said bracket and said spring anchoring means to bias said plate toward rotation in a direction to move said handle to clutch engaging position, whereby, if said clutch is disengaged mechanically while said handle is in clutch engaging position, the plate, hence said handle, will not rotate in response to movement of the intermediate linkage in a direction to apply compressive force to buckle said cable.

* * * * *

UNITED STATES PATENT AND TRADEMARK OFFICE
CERTIFICATE OF CORRECTION

PATENT NO. : 5,219,056

DATED : June 15, 1993

INVENTOR(S) : Charles L. Rassieur

It is certified that error appears in the above-identified patent and that said Letters Patent is hereby corrected as shown below:

In the claims:

Column 6, line 20 now "pwoer" should be -- power --
Column 6, line 27 now "palte" should be -- plate --
Column 6, line 34 now "wehreby" should be -- whereby --
Column 6, line 37 now "chanenl" should be -- channel --
Column 7, line 10 now "oc alim" should be -- of claim --
Column 7, line 15 now "hnadle" should be -- handle --

Signed and Sealed this

Twenty-fifth Day of January, 1994

*Attest:*

BRUCE LEHMAN

*Attesting Officer*     *Commissioner of Patents and Trademarks*